United States Patent [19]
Kesti et al.

[11] Patent Number: 5,824,748
[45] Date of Patent: Oct. 20, 1998

[54] COMPOSITE PRESSURE SENSITIVE ADHESIVE MICROSPHERES

[75] Inventors: Michael R. Kesti, Minneapolis; James E. Garbe, Inver Grove Heights; Joaquin Delgado, Stillwater; Spencer F. Silver, White Bear Lake; Richard J. Goetz, Woodbury, all of Minn.

[73] Assignee: Minnesota Mining And Manufacturing Company, St. Paul, Minn.

[21] Appl. No.: 657,266

[22] Filed: Jun. 3, 1996

[51] Int. Cl.⁶ .................................................. C08F 265/04
[52] U.S. Cl. ........................ 525/243; 525/98; 525/309; 525/310; 525/445; 525/455; 525/903; 428/402
[58] Field of Search ............................ 428/402; 525/309, 525/243, 310, 455, 445, 903, 98

[56] References Cited

U.S. PATENT DOCUMENTS

| | | | |
|---|---|---|---|
| 3,691,140 | 9/1972 | Silver | 260/78.5 |
| 4,166,152 | 8/1979 | Baker et al. | 428/522 |
| 4,495,318 | 1/1985 | Howard | 524/375 |
| 4,616,957 | 10/1986 | Burrows et al. | 405/179 |
| 4,786,696 | 11/1988 | Bohnel | 526/88 |
| 5,045,569 | 9/1991 | Delgado | 521/60 |
| 5,266,402 | 11/1993 | Delgado et al. | 428/355 |
| 5,508,313 | 4/1996 | Delgado et al. | 521/63 |
| 5,571,617 | 11/1996 | Cooprider et al. | 428/341 |

FOREIGN PATENT DOCUMENTS

| | | |
|---|---|---|
| 352901 | 8/1995 | European Pat. Off. . |
| WO 94/13751 | 6/1994 | WIPO . |
| WO 96/01280 | 1/1996 | WIPO . |
| WO 96/01281 | 1/1996 | WIPO . |
| WO 96/10295 | 1/1996 | WIPO . |

OTHER PUBLICATIONS

Odian, "Principles of Polymerization" 3rd ed., Wiley Interscience, 1991.

*Primary Examiner*—Ana Woodward
*Attorney, Agent, or Firm*—Carolyn V. Peters

[57] ABSTRACT

Composite pressure sensitive adhesive microspheres are provided comprising two or more water insoluble polymers that are mixed wholly within the boundaries of polymeric microspheres. The range of monomers and polymers are chosen to tailor the properties of the composite pressure sensitive adhesive microspheres for specific performance and/or application requirements. Any polymer that can be dissolved into a solvent monomer or mixture of solvent monomers can be used to prepare the composite pressure sensitive adhesive microspheres. Pressure sensitive adhesive microspheres according to this invention can be prepared using free radical suspension polymerization.

13 Claims, No Drawings

COMPOSITE PRESSURE SENSITIVE ADHESIVE MICROSPHERES

FIELD OF THE INVENTION

This invention relates to polymeric pressure sensitive adhesive microspheres that are comprised of a mixture of two or more polymers within the discrete boundaries of the polymeric microspheres.

BACKGROUND OF THE INVENTION

Inherently tacky pressure sensitive adhesive microspheres are known in the art to be useful in repositionable pressure sensitive adhesive applications and there are numerous references discussing preparation and/or use of inherently tacky, elastomeric polymeric microspheres. Pressure sensitive adhesive microspheres may be solid or hollow and are generally crosslinked to an extent such that the particulate nature of the adhesive is maintained throughout processing and use. Typically, pressure sensitive adhesive microspheres are prepared via suspension polymerization of one or more free radically polymerizable monomers in the presence of surfactants and/or suspension stabilizers. Choice of surfactants and/or suspension stabilizers and their specific combinations with specific monomers can determine suspension stability, desired particle morphology, performance characteristics, and the like.

One method that has been used to prepare materials with improved properties is the synthesis of polymeric materials that are comprised of mixtures of two or more distinct polymers. For example, high impact polystyrene (HIPS) is an example of a material that is comprised of a mixture of two or more polymers and has improved or unique properties. HIPS is prepared by dissolving rubbers such as natural rubber or poly(butadiene) in styrene followed by free radical bulk, suspension or solution polymerization. A composite material is obtained, which has improved impact strength relative to virgin poly(styrene).

An illustrative example in the field of pressure sensitive adhesives is described in EPO 352901 A wherein the addition of rubbers such as styrene-butadiene block copolymers to poly(acrylate)-based pressure sensitive adhesives resulted in improved cold temperature performance. Another illustrative example in the field of emulsion polymerization is described in U.S. Pat. No. 4,616,957 in which preformed polymers are dissolved in monomers prior to polymerization.

Yet another example, is one described in U.S. Pat. No. 5,266,402, wherein a pressure sensitive adhesive comprising an acrylate matrix and acrylate microspheres, wherein each microsphere has a discrete boundary and the microspheres and the matrix form an interpenetrating network within the boundary of the microspheres, wherein the matrix extends beyond the boundaries of the microspheres.

SUMMARY OF THE INVENTION

Briefly, in one aspect of the present invention, a composite pressure sensitive adhesive microspheres is provided comprising two or more water insoluble polymers that are mixed within the boundaries of polymeric microspheres. Furthermore, the present invention advantageously provides unique pressure sensitive adhesive microsphere compositions, as well as unique chemical and physical properties that are derived from the mixtures of polymers that reside wholly within the boundaries of the polymeric microspheres.

The range of monomers and polymers that can be used in this invention can be chosen in order to tailor the properties of the composite pressure sensitive adhesive microspheres for specific performance and/or application requirements. Additionally, the present invention provides repositionable adhesives with improved adhesive properties, such as cohesive strength, peel adhesion and static shear that can be used in product applications such as removable and repositionable labels, tapes and signs. Pressure sensitive adhesive microspheres according to this invention can be prepared using free radical suspension polymerization.

As used is this application, a polymer that is dissolved in a "solvent monomer" prior to carrying out suspension polymerization is hereinafter referred to as a "solute polymer". A "solvent monomer" is essentially water insoluble and may be a mixture comprised of one or more monomers and will dissolve the solute polymer. Furthermore, a solvent monomer may further include one or more monomers that may not dissolve a solute polymer, if such monomer was the only monomer used. Further yet, a solvent monomer may include one or more monomers that need not be essentially water insoluble, provided a mixture of monomers are selected and the mixture is essentially water insoluble. A "solvent monomer" is polymerized to form a "matrix polymer".

The product of suspension polymerization is a mixture of one or more solute polymers and one or more matrix polymers. Solvent monomers and solute polymers used to make the pressure sensitive adhesive microspheres of this invention can be freely selected from a wide range of polymers and monomers. As used in this application "monomer" may be used to include a mixture of monomers and "polymer" may be used to include a mixture of polymers, as well as copolymers, terpolymers and the like.

A solute polymer useful in the practice of the present invention is a polymer that can be dissolved in a solvent monomer. Advantageously, any polymer that can be dissolved into a solvent monomer or mixture of solvent monomers, as described below, can be used to prepare the composite microspheres of the present invention. Uniquely, the present invention provides composite microspheres, wherein the solute polymer is prepared from (1) monomers that are water insoluble or water nonreactive, (2) the combination of water soluble or water reactive and water insoluble or water nonreactive monomers, with the proviso the solute polymer is essentially water insoluble (3) monomers that are not polymerizable via free radical polymerization. Furthermore, the present invention provides composite microspheres, wherein the solute polymer and the matrix polymer are prepared using the same monomer but the resultant polymers, solute and matrix respectively, have different molecular weights or cross-linking densities, such as, for example a composite microsphere comprised of a high molecular weight poly(isooctyl acrylate) and a low molecular weight poly(isooctyl acrylate). Yet another combination may provide a composite microsphere comprised of a high $T_g$, polymer and a low $T_g$ polymer. Furthermore, a portion of the solute polymer may react with the matrix polymer. Additionally, the mixture of solute polymer and matrix polymer may include grafting or crosslinking between the several components.

Examples of such polymers include but are not limited to polymers prepared by polymerization methods that are incompatible with water such as certain Ziegler-Natta polymerizations, anionic polymerizations, group transfer polymerizations, ring opening polymerizations, condensation polymerizations and step growth polymerization or the like. Further, the reaction products of essentially water soluble or water reactive monomers in combination with enough water insoluble monomers to render the solute polymer water insoluble can be incorporated into the microsphere. Other such solute polymers which can be used include poly(acrylates), poly(methacrylates), poly(styrene)s, elastomers such as rubbers (natural and/or synthetic) or styrene-butadiene block copolymers, polyurethanes, polyureas, polyesters, crystalline and non-crystalline polymers such as crystalline and non-crystalline poly-α-olefins, mixtures thereof and the like. Solute polymers can have high molecular weight or low molecular weight or the composite microsphere may be comprised of a mixture of polymers of varying molecular weight.

The predominant solvent monomer(s) is essentially water insoluble and may be comprised of one or more monomers. If a mixture of monomers is used, each of the components need not be essentially water insoluble. Monomers, which may be water soluble or insoluble may also be used, provided that there is enough solvent monomers to dissolve the solute polymer.

Particularly useful solvent monomers include (meth)acrylates and vinyl esters Other vinyl monomers, such as styrene, acrylonitrile, mixtures thereof and the like, as well as various combinations of such solvent monomers may be used.

The combination of at least one solute polymer and at least one solvent monomer is chosen such that the solute polymer can be dissolved in the solvent monomer. The combination of solvent monomer and solute polymer results in an inherently pressure sensitive adhesive composite polymeric microsphere. The mixture of solute polymer and matrix polymer can have a wide range of morphologies, which is dependent on the compatibility of the two or more polymers in the microsphere. Such morphologies include homogeneous mixtures of polymers and phase-separated compositions in which the different polymers or mixtures of polymers exist in their own phases. The final morphology of the microspheres may be solid or hollow (contain one or more voids).

Suspension polymerization of solutions of polymers dissolved in monomers offers several distinct advantages over previously known pressure sensitive adhesive microspheres. One advantage of this invention is the incorporation of polymers into pressure sensitive adhesive microspheres that either cannot be prepared by free radical polymerization or in the presence of water. Yet another advantage of this invention is the incorporation of water reactive moities that normally react in the water phase prior to carrying out suspension polymerization into pressure sensitive adhesive microspheres. A further advantage of this invention is the ability to modify the physical properties of the microsphere by the incorporation of a wide variety of solute polymers such as rubbers that can alter the viscoelastic/mechanical properties of microspheres.

DESCRIPTION OF THE PREFERRED EMBODIMENT(S)

A pressure sensitive adhesive microspheres are provided comprising two or more water insoluble polymers that are mixed within the boundaries of polymeric microspheres. Furthermore, the present invention provides pressure sensitive adhesive microsphere compositions having chemical and physical properties that are derived from the mixtures of polymers that reside within the boundaries of the polymeric microspheres. Composite pressure sensitive adhesive microspheres are comprised of a mixture of one or more solute polymers and a matrix polymer, wherein the matrix polymer is the reaction product of a solvent monomer. Distinctly, the composite pressure sensitive adhesive microspheres are comprised of a solute component, comprising at least one solute polymer and a solvent component, comprising a matrix polymer that is the polymerization product of at least one solvent monomer.

The range of monomers and polymers that can be used in this invention is extensive and can be chosen to tailor properties of the pressure sensitive adhesive microspheres for specific performance and/or application requirements. Additionally, the present invention can be tailored to provide repositionable adhesives with improved adhesive properties such as cohesive strength, peel adhesion and static shear and such adhesives can be used in product applications, such as removable and repositionable labels, tapes and signs.

Pressure sensitive adhesive microspheres according to this invention may be prepared by the suspension polymerization of solutions of monomers and essentially water insoluble polymers. Specifically, a polymer ("solute component") is dissolved in at least one monomer ("solvent component"). This mixture is then emulsified in an aqueous solution of surfactants and/or suspension stabilizers and polymerized by suspension polymerization.

Solute Component

A solute polymer, which is essentially water insoluble may be comprised of any monomer or mixture of monomers that upon polymerization provides a polymer that can be dissolved into a solvent monomer or a mixture of solvent monomers, as described below. Typically, solute polymers have a molecular weight ($M_w$) of at least 2000.

The solute component is comprised of various classes of polymers. Any polymer may be used provided this solute polymer can be dissolved in a solvent monomer. For example, the solute polymer may be branched, modified, prepared using water reactive or water soluble monomers, monomers that are not free-radically polymerizable and combinations thereof. Furthermore, the solute polymers may be prepared according to any polymerization method that may be known to those skilled in the art and can be generally found in various references such as "Principles of Polymerization" Odian, 3rd ed., Wiley Interscience.

Nonlimiting examples of useful solute polymers include poly(acrylates), poly(methacrylates), poly(styrene)s, elastomers such as rubbers (natural and/or synthetic) or styrene-butadiene block copolymers, polyurethanes, polyureas, polyesters, crystalline and non-crystalline polymers such as crystalline and non-crystalline poly-α-olefins, crystalline poly(methacrylate) and crystalline poly(acrylate), and mixtures thereof and the like.

Advantageously, this invention provides composite pressure sensitive adhesive microspheres that can incorporate moieties that normally react in the water phase when used in monomeric forms prior to suspension polymerization of such monomers. Nonlimiting examples of solute polymers comprised of such water reactive moieties include, but are not limited to polymers containing maleic anhydride, itaconic anhydride, 2-vinyl-4,4-dimethyl-2-oxazoline-5-one (VDM) and 2-(isocyanato)ethyl methacrylate.

Further, highly water soluble moieties, such as (meth)acrylic acid, N-vinyl pyrrolidone, poly(ethylene) oxide macromonomer, (meth)acrylimide, 1,1-dimethyl-1(2-hydroxylpropyl)amine methacrylimide, 1,1,1-trimethylamine methacrylimide, 1,1-dimethyl-1(2,3-dihydroxypropyl)amine methacrylimide, and other water soluble moieties, such as, N,N-dimethyl-N-(β-methacryloxyethyl)ammonium propionate betaine, 4,4,9- trimethyl-4-azonia-7-oxo-8-oxa-dec-9-ene-1 sulfonate, sodium (meth)acrylate, ammonium acrylate, and maleic anhydride, for example can also be incorporated into the solute polymer used in the preparation of the composite pressure sensitive adhesive microspheres, provided that the solute polymer is essentially water insoluble.

Alternatively, incorporation of polymers into composite pressure sensitive adhesive microspheres that typically cannot be prepared by free radical polymerization or in the presence of water is provided by the present invention. Also, copolymers of water soluble and water insoluble monomers can be used as solute polymers. Such solute polymers would include, for example, poly(styrene), poly(t-butyl)styrene, poly-α-olefins, such as poly(propylene), poly(ethylene), poly(hexene), poly(octadecene) and/or poly(octene), styrene-butadiene block copolymers and the like (such as Kratons), polyesters, polyureas, and various copolymers of water soluble and insoluble monomers, such as styrene/acrylic acid, (t-butyl)styrene/acrylic acid, (meth)acrylate/poly(styrene) macromonomer/acrylic acid, (meth)acrylate/acrylic acid, (meth)acrylate/N-vinyl pyrrolidone, (meth) acrylate/poly(ethylene) oxide macromonomer, mixtures thereof, and the like.

Examples of suitable crystalline polymeric materials having crystallizable main chain or backbone segments include, but are not limited to, polyesters, polytetrahydrofuran, lower polyolefins (e.g., C2–C3 olefins), higher polyolefins (for example, C14–C20 olefins) and polyurethanes containing crystalline polyester segments. Also preferred are side chain crystalline polymeric materials derived from higher (α-olefin monomers, such as poly(1-decene), poly(1-dodecene), poly(1-tetradecene) and poly(1-hexadecene), and higher vinyl esters, such as vinyl tetradecanoate, vinyl hexadecanoate, and vinyl octadecanoate.

Examples of suitable crystalline polymeric materials having crystallizable pendant moieties (i.e., side chains) include, but are not limited to, poly(acrylate), poly (methacrylate), poly(acrylamide), poly(methacrylamide), poly(vinyl ester) and poly(α-olefin) polymers and copolymers having the following formula:

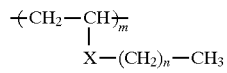

wherein X is —CH$_2$—, —C(O)O— —O—C(O)—, and —C(O)—NH—, etc., and n is large enough to provide sufficient side chain length and conformation to form polymers containing crystalline domains or regions at room temperature. Suitable crystalline polymeric materials include but are not limited to poly(dodecyl acrylate), poly (isotridecyl acrylate), poly(n-tetradecyl acrylate), poly(n-hexadecyl acrylate), poly(n-hexadecyl methacrylate), poly (n-octadecyl acrylate), poly(methacrylate), poly(acrylate), poly(behenyl acrylate), poly(eicosamyl acrylate), and mixtures thereof. Of these, poly(n-octadecyl acrylate), poly (behenyl acrylate), and mixtures or copolymers thereof are preferred.

Solvent Monomer/Matrix Polymer

The second component of the composite microspheres are matrix polymers, a polymerization product of solvent monomers. The predominant solvent monomer(s) is essentially water insoluble and may be comprised of one or more monomers.

Useful alkyl (meth)acrylate monomers are monofunctional unsaturated (meth)acrylate esters, the alkyl groups of which have from 4 to 14 carbons atoms. Such (meth) acrylates are oleophilic, water dispersible, and are essentially water insoluble. Furthermore, useful (meth)acrylates are those that as homopolymers, generally have a glass transition temperature below about –10° C., or if a combination of monomers is used, such a combination would produce a copolymer or terpolymer generally having a glass transition temperature below about –10° C. Nonlimiting examples of such (meth)acrylates include but are not limited to, isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, t-butyl acrylate, t-butyl methacrylate, isobornyl acrylate, methylmethacrylate, isononyl acrylate, isodecyl acrylate and the like, and the combination thereof.

Preferred alkyl (meth)acrylate monomers include isooctyl acrylate, isononyl acrylate, isoamyl acrylate, isodecyl acrylate, 2-ethylhexyl acrylate, t-butyl acrylate, isobornyl acrylate, butyl methacrylate, n-butyl acrylate, sec-butyl acrylate and mixtures thereof. Various combinations of these monomers can be used.

Vinyl ester monomers suitable for use in the present invention include but are not limited to: vinyl 2-ethylhexanoate, vinyl laurate, vinyl pelargonate, vinyl hexanoate, vinyl propionate, vinyl decanoate, vinyl octanoate, and other monofunctional unsaturated vinyl esters of linear or branched carboxylic acids comprising 1 to 14 carbon atoms, which as homopolymers have glass transition temperatures below about –10° C. Preferred vinyl ester monomers include vinyl laurate, vinyl 2-ethylhexanoate, and mixtures thereof.

Additional other vinyl monomers which, as homopolymers, have glass transition temperatures higher than about –10° C., such as vinyl acetate, acrylonitrile, styrene, mixtures thereof and the like, may optionally be utilized in conjunction with one or more of the acrylate, methacrylate and vinyl ester monomers provided the glass transition temperature of the resultant polymer is below about –10° C.

Preparation of Adhesive Microspheres

For composite microspheres or composite microparticles, suspension free radical polymerization methods, such as those described in U.S. Pat. Nos. 3,691,140; 4,166,152; 4,786,696; 5,045,569 and 5,508,313, and PCT Patent Appl. No.WO 96/01280, the disclosures of which are incorporated by reference, can be used with modification.

One such process of preparing composite pressure sensitive adhesive microspheres could comprise the steps of:

(a) preparing a solute polymer;

(b) dissolving the solute polymer in at least one solvent monomer to provide a solute polymer/solvent monomer mixture;

(c) dissolving an initiator in the solute/polymer/solvent monomer mixture;

(d) charging a reaction vessel with water, a surfactant, optionally, a stabilizer and the solute polymer/solvent monomer mixture to provide a reaction mixture; and (e) agitating the reaction mixture to create an emulsion and heating the emulsion while maintaining the agitation.

For the composite microspheres, suspension polymerizations are typically performed in the presence of a variety of emulsifiers, surfactants, stabilizers and/or under particular process conditions which induce the formation of, and prevent the agglomeration of, the particles (e.g., microspheres having a diameter of about 1–300 micrometers). The composite microspheres can be solid, hollow or a combination thereof. As used in the present application: (1) "hollow" means containing at least one void or cavity, wherein "cavity " means a space within the walls of a droplet or microsphere when still in the suspension or dispersion medium prior to drying, and thus containing whatever medium was used; "void" means a space completely within the walls of a polymerized microsphere; and "droplet" means the liquid stage of the microspheres prior to the completion of polymerization; and (2) "solid" means not hollow, that is, essentially void-free or cavity-free.

Adaptation of these processes to prepare composite microspheres of the present invention include dissolving a solute polymer into a solvent monomer mixture at a temperature such that the solute polymer component dissolves followed by the formation of an emulsion and subsequent polymerization of the monomer droplets.

Once polymerization takes place, the solvent monomers are converted to a matrix polymer, wherein the matrix polymer and the solute polymer (originally dissolved in the solvent monomer) are present within the boundary of the microspheres. Due to reactive moieties that may be present in either one of the polymers, graft sites between the polymers may be observed. Further, the matrix polymer may be crosslinked and a variety of methods are available to facilitate crosslinking such as, ionizing radiation, peroxides, silanes, metal ions, or multifinctional crosslinking agents. Preferably, multifunctional crosslinking agents are used, particularly for the preferred acrylate (co)polymers. Suitable multifunctional crosslinking agents include, but are not limited to, multifunctional acrylates, for example, 1,6-hexanedioldi(meth)acrylate and 1,4-butanedioldi(meth)acrylate, polymeric multifunctional (meth)acrylates, e.g., poly(ethylene oxide) diacrylate or poly(ethylene) oxide dimethacrylate; polyvinylic crosslinking agents, such as substituted and unsubstituted divinylbenzene; and difunctional urethane acrylates. These multifunctional crosslinking agents can be used in a variety of combinations. Preferred multifunctional crosslinking agents are those selected from the group consisting of acrylic or methacrylic esters of diols such as butanediol, triols such as glycerol, tetrols such as pentaerythritol, and mixtures thereof. When such multifunctional crosslinking agents are used, one or more are used in an amount up to about 0.15 equivalent weight percent, preferably up to about 0.1 equivalent weight percent, of the total polymerizable composition. The "equivalent weight %" of a given compound is defined as the number of equivalents of that compound divided by the total number of equivalents in the total composition times 100, wherein an equivalent is the number of grams divided by the equivalent weight. The equivalent weight is defined as the molecular weight divided by the number of polymerizable groups in the monomer (in the case of those monomers with only one polymerizable group, equivalent weight=molecular weight).

Surfactants will typically be present in the reaction mixture, preferably in an amount of no greater than about 10 parts by weight per 100 parts by weight of polymerizable monomer, more preferably no greater than about 5 parts by weight, and most preferably in the range of 0.5 to 3 parts by weight per 100 parts by weight of polymerizable monomer.

Useful surfactants (also known as emulsifiers) include anionic, cationic, or nonionic surfactants and include but are not limited to anionic surfactants, such as alkylarylether sulfates and sulfonates such as sodium alkylarylether sulfate, e.g., Triton™X200, available from Rohm and Haas, alkylarylpolyether sulfates and sulfonates such as alkylarylpoly(ethylene oxide) sulfates and sulfonates, preferably those having up to about 4 ethyleneoxy repeat units, and alkyl sulfates and sulfonates such as sodium lauryl sulfate, ammonium lauryl sulfate, triethanolamine lauryl sulfate, and sodium hexadecyl sulfate, alkyl ether sulfates and sulfonates such as ammonium lauryl ether sulfate, and alkylpolyether sulfate and sulfonates such as alkyl poly (ethylene oxide) sulfates and sulfonates, preferably those having up to about 4 ethyleneoxy units. Alkyl sulfates, alkyl ether sulfates, and alkylarylether sulfates are preferred. Additional anionic surfactants can include, for example, alkylaryl sulfates and sulfonates, for example sodium dodecylbenzene sulfate and sodium dodecylbenzene sulfonate, sodium and ammonium salts of alkyl sulfates, for example sodium lauryl sulfate, and ammonium lauryl sulfate; nonionic surfactants, such as ethoxylated oleoyl alcohol and polyoxyethylene octylphenyl ether; and cationic surfactants, such as a mixture of alkyl dimethylbenzyl ammonium chlorides wherein the alkyl chain contains from 10 to 18 carbon atoms. Amphoteric surfactants are also useful in the present invention and include for example sulfobetaines, N-alkylaminopropionic acids, and N-alkylbetaines.

Optionally, a polymeric stabilizer may be used and if used is present in an amount of up to about 0.05 and about 3 parts by weight per 100 parts by weight of the microspheres, preferably about 0.1 to about 1.5 parts by weight per 100 parts by weight of the microspheres. Advantageously, the presence of the stabilizer permits the use of relatively low amounts of surfactant while still obtaining microspheres.

Any polymeric stabilizer that effectively provides sufficient stabilization of the final polymerized droplets and prevents agglomeration within a suspension polymerization process is useful in the present invention.

Exemplary polymeric stabilizers include salts of polyacrylic acids of greater than 5000 weight average molecular weight (for example, ammonium, sodium, lithium and potassium salts), poly vinyl alcohol, carboxy modified polyacrylamides (for example, Cyanamer™A-370 from American Cyanamid), copolymers of acrylic acid and dimethylaminoethylmethacrylate and the like, polymeric quaternary amines (for example, General Analine and Film's Gafquat™ 755, a quaternized polyvinyl-pyrrolidone copolymer, or Union Carbide's "JR-400", a quaternized amine substituted cellulosic), cellulosics, and carboxy-modified cellulosics (for example, Hercules' Natrosol™ CMC Type 7L, sodium carboxy methycellulose).

Initiators affecting polymerization are those that are normally suitable for free-radical polymerization of acrylate monomers. Examples of such initiators include thermally-activated initiators such as azo compounds, hydroperoxides, peroxides and the like and photoinitiators such as benzophenone, benzoin ethyl ether and 2,2-dimethoxy-2-phenyl acetophenone. Other suitable initiators include lauroyl peroxide and bis(t-butyl cyclohexyl)peroxy dicarbonate. The initiator is present in a catalytically effective amount sufficient to bring about high monomer conversion in a predetermined time span and temperature range. Typically, the initiator is present in amounts ranging from 0.05 to approximately 2 parts per weight per 100 parts by weight of the microsphere composition starting materials.

Preparation of Pressure Sensitive Adhesives

The combination of at least one solute polymer and at least one solvent monomer is chosen such that the solute polymer can be dissolved in the solvent monomer. Further, the combination of solvent monomer and solute polymer results in a solute polymer/matrix polymer composite polymeric microsphere that is inherently pressure sensitive adhesive. The mixture of solute polymer and matrix polymer can have a wide range of morphologies, which is dependent on the compatibility of the two or more polymers in the microsphere. Such morphologies include homogeneous mixtures of polymers and phase-separated compositions in which the different polymers or mixtures of polymers exist in their own phases. When crystalline solute polymers are used, a preferred morphology is one wherein a crystalline solute polymer is dispersed in a matrix polymer.

Optionally, adjuvants, such as, rheology modifiers, colorants, fillers, stabilizers, tackifiers, plasticizers, latex binders and various other polymeric additives can be utilized. If such adjuvants are used, the amounts used in the adhesive mixture are amounts effective for the known uses of such adjuvants.

Adhesive Articles

Backings used as substrates for adhesive articles may be materials that are conventionally used as a tape backing or may be of other flexible material. Such backings include, but are not limited to, those made from materials selected from the group consisting of poly(propylene), poly(ethylene), poly(vinyl chloride), polyester (e.g., poly(ethylene terephthalate), such as those available under the trade designation of "Scotch" film 8050 from 3M)), polyamide films such as that available from DuPont Co., Wilmington, Del., under the trade designation "KAPTON," cellulose acetate, and ethyl cellulose. Backings may also be of woven fabric formed from threads of synthetic or natural materials such as cotton, nylon, rayon, glass, or ceramic material, or they may be of nonwoven fabric such as air laid webs of natural or synthetic fibers or blends of these. In addition, the backing may be formed of materials selected from the group consisting of metal, metallized polymeric film, and ceramic sheet material.

Preferred such materials include, but are not limited to, plastics such as polyethylene, polypropylene, polyesters, cellulose acetate, poly(vinyl chloride), and poly(vinylidine fluoride), as well as paper or other substrates coated or laminated with such plastics. These coated papers or thermoplastic films are often siliconized or otherwise treated to impart improved release characteristics. One or both sides of the backings or liners could have such release characteristics. Generally the backing or substrate material is about 50 $\mu$m to about 155 $\mu$m in thickness, although thicker and thinner backing or substrate materials are not precluded.

Typical coating methods that can be used to prepare adhesive articles according to the present invention, include both solvent coating and water-based coatings and techniques commonly known to those skilled in the art.

Particularly useful articles prepared using the pressure sensitive adhesive microspheres of the present invention include repositionable adhesive products such as repositionable note and paper products, repositionable tape and tape flags, easel sheets, repositionable glue sticks and the like, but may also include other non-repositionable industrial, commercial, and medical adhesive products.

Objects and advantages of this invention are further illustrated by the following examples. The particular materials and amounts thereof recited in these examples as well as other conditions and details, should not be construed to unduly limit this invention. All materials are commercially available except where stated or otherwise made apparent. All parts and percentages used herein are by weight, unless otherwise specified.

EXAMPLE

Test Methods

Adhesive Transfer

Adhesive transfer is defined as the amount of adhesive that transfers to an applied substrate when the adhesive coated sheet is peeled or removed from the substrate. The test is conducted by adhering a three-quarter inch (1.9 cm) wide strip of adhesive coated sheet to a clean area of a clay coated paper commercially available as Kromekote™ using a TLMI release and adhesion tester. The adhesive is allowed to remain in contact with the Kromekote™ for 30 seconds and then is removed at a 90° angle at a constant rate of 90 inches/minute. The clay coated strip is then analyzed by an image processor through a video camera and the percent adhesive coverage of the viewed area is recorded. Ten fields of view are analyzed and then averaged for each test sample. The test is repeated and results are reported as averages.

Peel Adhesion

Peel adhesion is the force required to remove an adhesive coated flexible sheet material from a test panel measured at a specific angle and rate of removal. In the examples, this force is expressed in grams per width of adhesive coated sheet.

Adhesion to Polyester

Adhesion to polyester film is measured by application of a 1.25 inches (3.2 cm) wide strip of polyester film to the surface of an adhesive coated sample which is fixed on a horizontal test plate. A 4.5 lb (2 kg) hard rubber roller is used to apply the strip. The free end of the polyester film is attached to an adhesion tester load cell such that the angle of removal will be 90° relative to the horizontal test plate. The polyester strip is peeled from the adhesive at a constant rate of 12 inches (31 cm) per minute. A load cell reading in grams per 1.25 inches (3.2 cm) is recorded. The test is repeated and the data is reported as the average of the number of trials.

Adhesion to Bond Paper

Peel adhesion is the force required to remove a coated sheet from a bond paper substrate at a specific angle and rate of removal. In the examples this force is expressed in grams per one inch width of coated sheet. The procedure followed is:

A strip, one inch wide, of coated sheet is applied to the horizontal surface of 20 pound bond paper. A 4.5 lb. hard rubber roller is used to firmly apply the strip to the bond paper. The free end of the coated sheet is attached to the adhesion tester load cell such that the angle of removal will be 90°. The test plate is then clamped in the jaws of the tensile testing machine which is capable of moving the plate away from the load cell at a constant rate of 12 inches per minute. A load cell reading in grams per inch of coated sheet is recorded. The test was repeated and the data is reported as the average of the number of trials.

Static Shear Test

The static shear test measures the time in minutes required to pull a standard area of adhesive coated sheet material from a flat test panel under stress of a constant, standard load in which the stress is in a direction parallel to the surface of the test panel. Stainless steel test panels are used in the examples.

The test is conducted on strips of adhesive coated sheet material which are applied to a test panel with a 4.5 pound (2 kg) hard rubber roller such that a either a 1.0 inch by 1.5 inch (2.54×3.81 cm) or a 1.0 inch by 1.0 inch (2.54×2.54 cm) portion of each strip is in contact with the panel. The panel with the coated strip attached is held in a rack in a near vertical position such that the panel forms an angle of 92° relative to horizontal. The 2° offset from the vertical position is used to negate any peel forces, thus insuring that only shear forces are measured. A 1 kg weight is attached to the free end of the adhesive coated strip and the time elapsed for the coated strip to separate from the test panel is recorded in minutes. The test is repeated and the data is reported as the average of the number of trials.

% Solvent Soluble Portion

To determine the solvent soluble content of the prepared microspheres, the following process is used.

One gram of the water suspension of microspheres is dried in a vacuum oven without heat. After drying, 100 ml of n-heptane is added and shaken for 24 hours. After shaking, the dispersion is poured through a filter paper (30 micrometer pores) to remove the non-soluble content. The filtrate is then dried in a 100° F. oven.

The weight of the dried filtrate divided by the dried suspension microspheres is the % solvent soluble polymer content. The test is repeated and the data is reported as the average of the number of trials.

| | Glossary |
|---|---|
| IOA | isooctyl acrylate |
| AA | acrylic acid |
| ODA | octadecyl acrylate |
| 1,4-BDA | 1,4-butanediol diacrylate |
| mv | mean volume |
| sd | standard deviation |
| μm | micrometers |
| VDM | 2-vinyl-4,4,-dimethyl-2-oxazoline-5-one |
| NVP | N-vinyl pyrrolidone |
| PEO-750 | An acrylate terminated poly(ethylene oxide) macromonomer ofmolecular weight of 750 |
| mg | milligram |
| "repositionable" | refers to the ability to be repeatedly adhered to and removed from a substrate without substantial loss of adhesion capability |
| Mw | weight average molecular weight |
| AIBN | 2,2'-azobis(2-methylpropionitrile) |

Examples 1–7

Preparation of the 80/20 IOA/AA Solute Copolymers used in Examples 1–7

A 36 grams portion of IOA, 9 grams of AA, 180 grams of 2-butanone and 1 ml of a solution of 0.585 grams AIBN dissolved in 10 ml of 2-butanone were added to three 500 ml amber bottles. The solutions were purged with nitrogen for five to ten minutes and the bottles were sealed with caps. The bottles were placed in an Atlas Launder-o-meter™ water bath, heated to 65° C. and shaken overnight. The bottle was then cooled and the solution evaporated to dryness in a Teflon-lined pan, first at room temperature, and then in a forced air oven at 55° C. to afford a transparent, slightly yellow 80/20 IOA/AA copolymer.

The polymer was characterized by gel permeation chromatography and found to have a Mw of 61,000. This polymer was used in Examples 1–4. A similar IOA/AA copolymer with a Mw of 86,000 was prepared by repeating the polymerization at slightly higher solids (33%) and with a lower amount of AIBN (0.066% of monomer). This polymer was used in Examples 5 and 6.

Example 1

This example describes the preparation of a composite MSA containing 25% of an 80/20 IOA/AA solute copolymer and 75% of a poly(IOA) matrix copolymer. A 2 L split reaction flask equipped with a mechanical stirrer, temperature controller, heat lamps, nitrogen inlet and baffle was loaded with 600 grams of DI water and 4 grams of Siponate DS-10 (tradename for sodium dodecylbenzenesulfonate commercially available from Alcolac, Inc), heated to 65° C. and purged with flowing nitrogen. In a separate container, 0.929 grams of Lucidol 70 (tradename for 70% active benzoyl peroxide available from Pennwalt Corporation) and 50 grams of the 80/20 IOA/AA solute copolymer were dissolved in 150 grams of IOA. Upon equilibration of the aqueous solution to 65° C., the stir rate was set to 450 rpm and the IOA/copolymer/benzoyl peroxide solution was added. The solution was purged with flowing nitrogen for an additional 5 minutes, sealed from the atmosphere via the use of a bubbler and allowed to react at 65° C. for 8 hours. A reaction exotherm was observed, having a temperature peak of ~68° C., after 24 min after the addition of the monomer solution. After the 8 hours time period, the solution was cooled to room temperature and filtered through cheese cloth. Microscopy indicated the presence of solid microspheres. Particle size analysis indicated a mean volume diameter of 68 microns. The solvent soluble portion of the microspheres was determined to be 38%.

Examples 2–C7

Examples 2–C7 were prepared according to the procedure described in Example 1 except that the amount of the 80/20 IOA/AA solute copolymer was varied in order to make composite pressure sensitive adhesive microspheres compositions containing 15, 5, 3, 1.5, 0.5 and 0% of the 80/20 IOA/AA compolymer. Results for particle size and % solvent soluble portion are summarized in Table 1.

TABLE 1

Examples 1–C7:
Composite microspheres prepared with varying amounts of an 80/20 IOA/AA copolymer A.

| Example | Lucidol 70 (g) | IOA (g) | 80/20 IOA/A Copolymer (g) | 80/20 IOA/AA Copolymer (%) | Particle Size (μm) | % Solvent Soluble Portion |
|---|---|---|---|---|---|---|
| 1 | 0.929 | 150 | 50 | 25 | 68 | 38 |
| 2 | 0.831 | 170 | 30 | 15 | 40 | 38 |
| 3 | 0.929 | 190 | 10 | 5 | 34 | 23 |
| 4 | 0.978 | 194 | 6 | 3 | 34 | 25 |
| 5 | 0.978 | 197 | 3 | 1.5 | 34 | 22 |
| 6 | 0.978 | 199 | 1 | 0.5 | 42 | 22 |
| C7 | 0.978 | 200 | 0 | 0 | 58 | 28 |

Coating/adhesive performance of adhesives prepared in Examples 1–C7

(A) Solvent Based Coatings

The adhesives described in Examples 1–C7 were evaluated for adhesive performance. Each pressure sensitive adhesive microspheres was isolated from water via the addition of isopropylalcohol to the suspension which resulted in massive coagulation. The coagulated polymer was dried to approximately 80% solids and dispersed in enough heptane to obtain an 8% solids dispersion. Samples were shaken overnight and then mixed with a mechanical stirrer for several minutes in order to ensure uniform dispersion of the microspheres. The heptane dispersions were coated onto primed paper using a 4 mil (0.1 mm) gap between the paper and the coater knife. The coatings were tested for adhesion to polyester (g/1.25" or g/3.175 cm), adhesion to bond paper (g/inch or g/2.54 cm), adhesive transfer and static shear to stainless steel (1.5"×1.0"×1 kg or 3.81×3.81 cm×1 kg). Results are summarized in Table 2.

TABLE 2

Adhesive properties for Examples 1–C7 coated onto primed paper.

| Example | 80/20 IOA/AA Copolymer (%) | Adhesion to Polyester (g/1.25") | Adhesion to Bond Paper (g/1") | % Adhesive Transfer | Static Shear (min) 1.5" × 1.0" × 1 kg |
|---|---|---|---|---|---|
| 1 | 25 | 2 | 2 | 0.01 | 0 |
| 2 | 15 | 33 | 12 | 0.5 | 2150 |
| 3 | 5 | 81 | 30 | — | — |
| 4 | 3 | 98 | 33 | 2.7 | 10,000+ |
| 5 | 1.5 | 104 | 42 | 1.2 | 10,000+ |
| 6 | 0.5 | 77 | 52 | 4.0 | 230 |
| C7 | 0 | 88 | 54 | 13.1 | 144 |

The data in Table 1 illustrate improvements in adhesive properties that were obtained using the methods described in this invention. For example, static shear performance was greatly increased from 144 min to greater than 10,000 minutes by adding a small amount (1.5 or 3.0%) of 80/20 IOA/AA copolymer while adhesion to polyester and bond remain good. Such a high shear strength, removable adhesive has uses in many applications such as removable labels, signs and tapes. The adhesion data to polyester and bond paper illustrated the ability to control adhesion to different surfaces. For example, at low loadings of IOA/AA copolymer, adhesion to polyester increased whereas adhesion to bond paper decreased. Such "differential adhesion" is desirable for applications in which low adhesion to delicate substrates and higher adhesions to more durable substrates are desired.

Percent adhesive transfer was found to decrease significantly when solute copolymer is added to the microsphere. Only a small amount of solute copolymer is needed to improve adhesive transfer greatly. This is an advantage as clean removability from substrates is improved.

(B) Waterbased Coatings

Examples 1–C7 were coated out of water in order to demonstrate that similar improvements in performance can be seen when compared to solvent based coatings. Each adhesive was allowed to separate upon standing into a microsphere-rich and microsphere-poor phase. A portion of the microsphere-rich phase was diluted to 50% solids via the addition of deionized water, dispersed via agitation and coated through a 1 mil gap onto a 3M polyester film product "Scotch 8050". The coated samples were tested for adhesive performance; results are summarized in Table 3.

Example 8

This example describes the preparation of microspheres containing 20% of an 80/20 IOA/NVP solute copolymer ($M_w$=133,000) and 80% of a poly(IOA) matrix polymer. The IOA/NVP copolymer was first prepared by solution polymerization in a similar manner to that used for the preparation of the IOA/AA copolymer used in Examples 1 to 4.

A 2 L split reaction flask was loaded with 325 grams of deionized water, 8.75 grams of Triton™ X-200 (tradename for a 30% solids dispersion of alkyl aryl polyethylene oxide sodium sulfonate commercially available from Rohm and Haas Company) and 7.0 grams of Goodrite™ K-702 (tradename for a 25% solids aqueous solution of polyacrylic acid, 240,000 weight average molecular weight, commercially available from B. F. Goodrich Company) The solution was stirred at 450 rpm, neutralized to pH 7 with concentrated ammonium hydroxide, and heated to 65° C. under a nitrogen purge. In a separate container, 655 mg of Lucidol™ 70 was dissolved in 58 grams of IOA; 117 grams of a 30% solution of a 80/20 IOA/NVP copolymer dissolved in IOA was then added. The resulting solution was mixed for 10 minutes and then added to the heated aqueous solution. The solution was purged with nitrogen and allowed to react at 65° C. for 45 min and then at 80° C. for 2 hours. The solution was cooled and filtered through cheese cloth.

No coagulum was observed. Microscopy indicated the presence of solid, microspheres. Particle size analysis indicated a mean volume diameter of 69 μm. Elemental analysis of the adhesive indicated a nitrogen content of 0.51%, which is nearly identical to the theoretical amount of 0.50%.

TABLE 3

| Example | % 80/20 IOA/AA Copolymer | Adhesion to Polyester (g/1.25") | Adhesion to Bond Paper (g/inch) | % Adhesive Transfer | Static Shear (min) 1.0" × 1.0" × 1 kg | Static Shear (min) 1.0" × 1.0" × 1 kg |
|---|---|---|---|---|---|---|
| 1 | 25 | 55 | 27 | 0.4 | 40 | 160 |
| 2 | 15 | 84 | 24 | 1.1 | 70* | 490 |
| 3 | 5.0 | 231 | 90 | 1.0 | 4660 | 17,000+* |
| 4 | 3.0 | 276 | 107 | 0.2 | 5630 | 17,000+ |
| 5 | 1.5 | 247 | 111 | 0.2 | 10110 | 17,000+ |
| 6 | 0.5 | 261 | 149 | 4.4 | 240 | 17,000+ |
| C7 | 0 | 239 | 178 | 16.3 | 210 | 1060 |

Data in Table 3 are reported as averages of two or three replicates unless the value is noted with "*", in which case only one replicate was carried out.

Example 9

This example describes the preparation of microspheres containing 10% of an IOA/PEO-750 solute copolymer and 90% of a poly(IOA) matrix polymer. PEO-750 is an acrylate terminated poly(ethylene oxide) macromonomer having an average molecular weight of 750. An IOA/PEO-750 copolymer was first prepared by adding 14 grams of IOA, 6 grams of PEO-750, 0.06 grams of Vazo 64 (tradename for 2,2'-azobis(2-methylpropanenitrile), commercially available from DuPont Co.), 0.3% of $CBr_4$ and 58 grams of ethyl acetate into a bottle. The solution was degassed with nitrogen, the bottle capped and placed in a Launder-o-meter™ for 22 hours at 60° C. Following the reaction, the ethyl acetate was removed from the bottle via evaporation.

Polymeric microspheres were prepared by loading a one liter split, baffled reactor with 6 grams of Standapol™ A (tradename for a 29% solids ammonium lauryl sulfate solution commercially available from Henkel Corp.) and 450 grams of deionized water. In a separate container, 4.5 grams of AA, 15 grams of the 70/30 IOA/PEO-750 copolymer, 710 mg of Lucidol-75 (tradename for 75% active benzoyl peroxide available from Pennwalt Corporation) were dissolved in 133.5 grams of IOA. The IOA mixture was then added to the reactor and the resultant emulsion homogenized until the average monomer droplet size was approximately 1 micrometer in diameter. The solution was stirred at 400 rpm, heated to 55° C., degassed with argon and allowed to react for 22 hours. Following the reaction, there was little coagulum in the reactor. Analysis by microscopy indicated the presence of microspheres 2 to 10 micrometers in diameter.

Example 10

This example describes the preparation of microspheres containing 25% of a 75/25 IOA/PEO-750 solute copolymer and 75% of a poly(IOA) matrix polymer. First, a 75/25 IOA/PEO-750 copolymer was prepared by combining 264 grams of IOA, 88 grams of PEO-750, 720 grams of 2-butanone and 0.35 grams of AIBN in a large beaker. The solution was stirred until the initiator was dissolved, divided among four 16 oz narrow-mouth amber bottles and purged with nitrogen. Each bottle was immediately capped then placed in a Launder-o-meter™ at 65° C. and allowed to react overnight. The polymer was isolated by removal of the solvent via evaporation.

Polymeric microspheres were prepared by dissolving the 75/25 IOA/PEO-750 copolymer in IOA at 25% solids. To a 59.75 gram portion of this solution was added 0.8 grams of Lucidol 70 and the mixture was stirred until the initiator dissolved. A split reaction flask was loaded with 740 grams of DI water and 4 grams of Siponate DS-10. The solution was heated to 70° C. and stirred at 400 rpm. Both solutions were purged with nitrogen and then the IOA mixture was added to the flask. The temperature was increased to 80° C. After 2 hours, the solution was cooled to room temperature. Analysis by microscopy indicated the presence of microspheres 3 to 40 micrometers in diameter.

Example 11

This example describes the preparation of microspheres containing 13% of a 80/20 IOA/VDM (VDM=2-vinyl-4,4-dimethyl-2-oxazoline-5-one) solute copolymer and 87% of a poly(IOA) matrix polymer. An 80/20 IOA/VDM was first prepared by combining 240 grams of IOA, 60 grams of VDM, 600 grams of 2-butanone and 0.6 grams of AIBN in a large beaker. The solution was stirred until the initiator was dissolved, divided among four 16 oz narrow-mouth amber bottles and purged with nitrogen. Each bottle was immediately capped then placed in a Launder-o-meter™ at 65° C. and allowed to react overnight. The polymer was isolated by removal of the solvent via evaporation.

Polymeric microspheres were prepared by dissolving 41 grams of the IOA/VDM copolymer in 272 grams of IOA. A 239 grams portion of this solution was mixed with 0.8 grams of Lucidol 70 and allowed to mix at ~45° C. until dissolved. The resultant solution was added to a reaction flask which contained 740 grams of DI water and 4.5 grams of Siponate DS-10 surfactant at 70° C. The resultant mixture was stirred at 450 rpm. The temperature was raised to 80° C. for 2 hours and then allowed to cool to room temperature. Little or no agglomeration was observed. Analysis by microscopy indicated the presence of well-formed, solid spheres. Particle size analysis indicated a mean volume diameter of 34 micrometers.

Example 12

This example describes the preparation of a microsphere containing 10% of a polyhexene solute polymer and 90% of a poly(IOA) matrix polymer. A 2 L split reaction flask was loaded with 730 grams of DI water, 4.4 grams of Siponate DS-10, 9.6 grams of Acumer 1530 (tradename for a 25% solids aqueous solution of poly(acrylic acid) with weight average molecular weight of 190,000 commercially available from Rolun and Haas) and enough concentrated ammonium hydroxide to neutralize the solution to pH 7. The solution was stirred at 520 rpm, heated to 65° C. and purged with nitrogen. To this solution was added a solution of 24 grams of poly(hexene) (obtained from Eastman Kodak; Mw=96,000) and 800 mg of Lucidol 70 dissolved in 215 grams of IOA. The solution was purged with flowing nitrogen for an additional four minutes and then the reactor was sealed to a bubbler. The mixture was allowed to react at 65° C. for 1 hour, and then at 80° C. for 2 hours. The mixture was cooled to room temperature and filtered through cheese cloth.

No coagulum was observed. Analysis by microscopy indicated the presence of microspheres. Particle size analysis indicated a symmetric distribution of sizes with a mean volume diameter of 38 micrometers.

Example C13

Example C13 was prepared in a similar manner to that of Example 12 except that no polymeric stabilizer (neutralized Acumer 1530) was used. In contrast to Example 12, Example C13 produced predominantly agglomerated microspheres that could not be filtered through cheese cloth.

Example C14

Example C14 was prepared in a similar manner to that of Example C13 except that no polyhexene was added. Suspension of microspheres which filtered easily through cheese cloth was obtained.

Examples 12, C13, and C14 show that composite pressure sensitive adhesive microspheres can be more difficult to produce than non-composite microspheres.

Example 15

This example describes the preparation of microspheres containing 3% of a polyoctene solute polymer and 97% of a poly(IOA) matrix polymer. A 2 L split reaction flask was loaded with 739 grams of DI water, 9.6 grams of Acrysol A-3 (tradename for a 25% solids aqueous solution of poly (acrylic acid) with Mw less than 150,000 commercially available from Rohm and Haas Company), 4.5 grams of Siponate DS-10 and enough concentrated ammonium hydroxide to neutralize the solution to pH 7. The solution was stirred at 500 rpm. A solution of 800 mg of Lucidol 70 and 7.2 grams of polyoctene (obtained from Eastman Kodak; Mw=1,100,000) dissolved in IOA was added. The mixture was heated to 70° C. and purged with nitrogen. A reaction exotherm to a peak temperature of 76° C. was observed after about 15 minutes. The reaction was then stirred for 2 h at 80° C., cooled to room temperature and filtered through cheese cloth. No coagulum was observed. Particle size analysis indicated a mean volume diameter of 52 micrometers.

Example 16

This example describes the preparation of microspheres containing 20% of poly(IOA) as the solute polymer and 80% of a poly(IOA) matrix polymer.

A 300 grams portion of DI water, 2 grams of Siponate DS-10 and 4 grams of Acumer 1530 and enough concentrated ammonium hydroxide to neutralize the solution to pH 7 were added to 2 L split reaction flask, and heated to 65° C. under flowing nitrogen. A solution of 20 grams of poly(IOA) ($M_w$=250,000,) and 270 mg of Lucidol 70 dissolved in 80 grams of IOA was added to the aqueous solution and stirred at 470 rpm. After 1 hour, the temperature was raised to 80° C. for 2 hours. The solution was cooled to room temperature and then filtered through cheese cloth. No coagulum was observed. Analysis by microscopy indicated the presence of solid microspheres. Particles size analysis indicated a mean volume diameter of 51 micrometers.

Example 17

This example describes the preparation of microspheres containing 5% of Kraton 1111 rubber as the solute polymer and 95% poly(IOA) as the matrix polymer. Kraton was dissolved in IOA at 10% solids by shaking overnight. A 75 grams portion of this solution was added to a solution of 680 mg of Lucidol-75 dissolved in 75 grams of IOA and mixed until homogeneous. A 1 L split reaction flask was then loaded with 407 grams of DI water, 30 grams of a 10% solution of ammonium lauryl sulfate (Stepanol AM-V, which had been diluted with DI water) and 13 grams of poly(ammonium acrylate) at 11.5% Goodrite K-702, which has been diluted with DI water and neutralized with concentrated ammonium hydroxide). The IOA solution was added. The solution was stirred at 450 rpm, heated to 65° C. and degassed with nitrogen. An exothermic reaction with a peak temperature of 67° C. was detected after 30–45 min. After 5 h at 65° C., the solution was cooled to room temperature and filtered through cheese cloth. No coagulum was observed. Analysis by microscopy indicated the presence of microspheres with a small amount of voids. Particle size analysis indicated a mean volume diameter of 72 $\mu$m.

Example 18

This example describes the preparation of a microsphere containing 4% of poly(styrene) as the solute polymer. A 3.0 gram portion of polystyrene (Mw=5000) and 0.25 grams of VAZO 52 were dissolved in 70.25 grams of IOA. A 1 L split reaction flask was loaded with 450 grams of DI water, 3.0 grams of acrylic acid and 5.0 grams of Standapol A. The aqueous solution was neutralized to pH 7 with ammonium hydroxide. The IOA/polystyrene solution was added to the aqueous solution. The mixture was stirred at 400 rpm, heated to 55° C. and degassed with argon. After 5 hours at 55° C., the reactor was emptied and the suspension filtered through cheese cloth. No coagulum was observed. Analysis by optical microscopy indicated the presence of microspheres with an average diameter of 10 to 20 micrometers that contained many small inclusions approximately 2 micrometers in diameter.

Example 19

This example describes the preparation of microspheres containing 5% of —CH$_2$CH$_2$—OH terminated poly(styrene) as the solute polymer. A 1 L indented flask was charged with 880 ml of deionized water and 3.60 grams of acrylic acid, and neutralized to pH 7 with concentrated ammonium hydroxide. To this solution was added a solution of 6.0 grams of —CH$_2$CH$_2$—OH terminated poly(styrene) with a Mw of 10,000 and 0.30 grams of Vazo 52 dissolved in 110.4 grams of IOA. The mixture was stirred at 350 rpm and degassed with argon. A 2.0 grams portion of Siponate DS-10 was added. The solution was degassed with argon for an additional 10 minutes and heated to 55° to 65° C. A sample taken after 45 minutes showed the presence of microspheres 10–20 micrometers in diameter that contained numerous small inclusions approximately 2 micrometers in diameter.

Example 20

Example 20 was repeated in a similar manner to that of 19 except that 4.4 grams of a three-arm branched polystyrene with a Mw of 120,000 was used in place of the —CH$_2$CH$_2$— OH terminated poly(styrene). Microspheres, 10–20 micrometers in diameter, that contained numerous small inclusions approximately 2 micrometers in diameter were produced.

Example 21

The example describes the preparation of a microsphere containing 5% of poly(vinyl ethyl ether) as the solute polymer. Poly(vinyl ethyl ether) (obtained from Scientific Polymer Products, Inc., catalog no. 638) was dissolved in IOA at 10% solids. A 75 gram portion of this solution was added to a solution of 680 mg of Lucidol 75 dissolved in 75 grams of IOA. The resultant solution was added to a 1 L split reaction flask that had been loaded with 406 grams of DI water, 30 grams of a 10% solution of ammonium lauryl sulfate (Stepanol AM-V, which has been diluted with DI water) and 13 grams of a 11.5% solution of poly(ammonium acrylate) (Goodrite K702, which had been diluted with DI water and neutralized with concentrated ammonium hydroxide). The mixture was heated to 65° C., degassed with nitrogen and allowed to react for 6 hours. The solution was cooled to room temperature and filtered through cheese cloth. No coagulum was observed. Analysis by microscopy indicated the presence of microspheres that contained small voids or inclusions. Particle size analysis indicated a mean volume diameter of 55 $\mu$m. Addition of isopropyl alcohol to a small portion of the suspension resulted in coagulation; a tacky polymeric mass was obtained.

Example 22

The example describes the preparation of a microsphere containing 5% of poly(isobornylacrylate) as the solute polymer and 95% of a 96/4 IOA/AA matrix copolymer. In a 1 L split reaction flask, a 1.05 grams portion of a 10% solution of poly(isobornyl acrylate) (obtained from Scientific Polymer Products, Inc.) dissolved in IOA was added and the solution was mixed well. A 407 grams portion of DI water, 30 grams of a 10% aqueous solution of ammonium lauryl sulfate (Stepanol™ AM-V, which had been diluted with DI water) and 13 grams of an 11.5% solution of poly (ammonium acrylate) (Goodrite K-702, which had been diluted with DI water and neutralized with concentrated ammonium hydroxide) was then added. The mixture was stirred at 450 rpm, heated at 65° C., purged with nitrogen and then allowed to react at 65° C. for about 9 hour. An exotherm was observed with a peak temperature of 72° C. The reaction was cooled to room temperature and filtered through cheese cloth. No coagulum was observed. Analysis by microscopy indicated the presence of microspheres which had a small amount of inclusions approximately 1–5 micrometers in diameter. Particle size analysis indicated mean volume diameter of 30 micrometers.

Example C23

Example 22 was repeated except that no acrylic acid was used in Example C23. The reaction agglomerated and could not be filtered through cheese cloth.

Example 24

This example describes the preparation of microspheres containing 2% of a 98/2 IOA/AA copolymer as the solute copolymer. A 1 L indented flask was charged with 880 ml of deionized water, 3.60 grams of acrylic acid and enough concentrated ammonium hydroxide to neutralize the solution to pH 7. To this solution was added 12.0 grams of Standapol™ A and a solution of 4.3 grams of a 98/2 IOA/AA copolymer and 0.86 grams of Lucidol™ 70 dissolved in 220 grams of IOA. The mixture was degassed with argon, agitated vigorously, heated to 55° to 65° C., and allowed to react overnight. A suspension of hollow microspheres with relatively large sized single inclusions was obtained.

Example C25

This example was prepared in a similar manner to that of Example 24 except that the 92/2 IOA/copolymer was not added. A suspension of solid microspheres was obtained.

Example 26

This example describes the preparation of microspheres containing 5% of poly(ODA) as the solute polymer and 95% of poly(IOA) as the matrix polymer. A one liter glass reactor was loaded with 7.5 grams of an aqueous solution of polyacrylic acid at 20 wt % solids, 450 grams of deionized water, enough concentrated ammonium hydroxide to neutralize the solution to a pH of 7 and 6.0 grams of Standapol A. The reactor was heated to 65° C. while stirring at 600 rpm. In a glass jar, 7.5 grams of poly(ODA) were dissolved in 142.5 grams of IOA and 0.04 grams of 1,4-BDA, with heating. After the poly(ODA) was dissolved, 0.67 grams of Lucidol 70 was dissolved in the monomer-polymer solution. When the contents of the reactor reached 65° C., the solution of poly(ODA) in the monomers containing the initiator was added while keeping the rate of agitation at 600 rpm. After 15 hours at 65° C., the contents of the reactor were allowed to cool to room temperature.

Several drops of the microsphere suspension were dried on a glass slide. The microspheres were tacky to the touch. Optical microscopy showed microspheres with an average diameter of about 40 micrometers.

Examples 27–28

The following examples were prepared according to the procedure described in Example 26 with the amounts of, monomers and initiators shown in Table 4.

TABLE 4

| Example | Poly(ODA) | IOA | 1,4-BDA | Lucidol 70 |
|---|---|---|---|---|
| 27 | 15 | 135 | 0.04 | 0.64 |
| 28 | 22.5 | 127.5 | 0.04 | 0.60 |

Various modifications and alterations of this invention will become apparent to those skilled in the art without departing from the scope and principles of this invention, and it should be understood that this invention is not be unduly limited to the illustrative embodiments set forth hereinabove. All publications and patents are incorporated herein by reference to the same extent as if each individual publication or patent was specifically and individually indicated to be incorporated by reference.

We claim:

1. Composite pressure sensitive adhesive microspheres comprising a mixture of two or more water insoluble polymers that are present wholly within the boundaries of the polymeric microspheres, wherein at least one water insoluble polymer is a solute polymer and at least one water insoluble polymer is a matrix polymer.

2. Composite pressure sensitive adhesive microspheres according to claim 1, wherein the microspheres are the reaction product of (1) at least one solute polymer and (2) at least one solvent monomer, wherein the solute polymer can be dissolved in the solvent monomer and the polymerized solvent monomer is a matrix polymer.

3. Composite pressure sensitive adhesive microspheres according to claim 2, wherein the solvent monomer is essentially water insoluble and is comprised of one or more monomers and dissolves the solute polymer.

4. Composite pressure sensitive adhesive microspheres according to claim 3, wherein the solvent monomer may further include one or more monomers that may not dissolve a solute polymer.

5. Composite pressure sensitive adhesive microspheres according to claim 2, wherein the solute polymers comprise polymers prepared by Ziegler-Natta polymerizations, anionic polymerizations, group transfer polymerizations, ring opening polymerizations, free-radical condensation polymerizations and step growth polymerization.

6. Composite pressure sensitive adhesive microspheres according to claim 5, wherein the solute polymers comprise, elastomers, crystalline and non-crystalline polymers, or mixtures and combinations, thereof.

7. Composite pressure sensitive adhesive microspheres according to claim 6, wherein the solute polymers comprise poly(acrylates), poly(methacrylates), poly(styrene)s, styrene-butadiene block copolymers, polyurethanes, polyureas, polyesters, or mixtures and combinations, thereof.

8. Composite pressure sensitive adhesive microspheres according to claim 2, wherein the solvent monomers comprise (meth)acrylates, vinyl esters, styrene, acrylonitrile, or mixtures thereof.

9. Composite pressure sensitive adhesive microspheres according to claim 1, wherein the solute polymer is prepared from (1) monomers that are water insoluble or water nonreactive, (2) combination of water soluble or water reactive and water insoluble or water nonreactive monomers, with the proviso the solute polymer is essentially water insoluble or (3) mixtures thereof.

10. Composite pressure sensitive adhesive microspheres according to claim 9, wherein the monomers used to prepare the solute polymer and the matrix polymer are the same monomer, but the solute and matrix polymers have different molecular weights or cross-linking densities.

11. Composite pressure sensitive adhesive microspheres according to claim 9, wherein the solute polymer and the matrix polymer have different glass transition temperatures.

12. Composite pressure sensitive adhesive microspheres according to claim 1, wherein the microspheres are hollow, solid, or mixtures thereof.

13. Composite pressure sensitive adhesive microspheres, according to claim 1, wherein the microspheres are prepared by suspension polymerization of solutions of at least one solute polymer dissolved in at least one solvent monomer.

* * * * *

UNITED STATES PATENT AND TRADEMARK OFFICE
CERTIFICATE OF CORRECTION

PATENT NO.: 5,824,748

DATED: Oct. 20, 1998

INVENTOR(S): Michael R. Kesti, James E. Garbe, Joaquin Delgado, Spencer F. Silver, Richard J. Goetz It is certified that error appears in the above-identified patent and that said Letters Patent is hereby corrected as shown below:

Col. 6, Lines 12 and 16, replace "isobomyl" with -- isobornyl --

Col. 12, Table 1, 4th column title should read:
-- 80/20
   IOA/AA
   Copolymer
   (g) --

Col. 13, Table 3, last column title should read:
-- Static Shear
   (min)
   1.5" x 1.0" x 1 kg --

Col. 13, Table 3, example 4, last column should read:
-- 17,000+* --

Col. 16, Line 31, replace Rolun with -- Rohm --

Signed and Sealed this

Twentieth Day of April, 1999

Attest:

Q. TODD DICKINSON

Attesting Officer

Acting Commissioner of Patents and Trademarks